United States Patent
Pawson et al.

(10) Patent No.: US 8,137,783 B2
(45) Date of Patent: *Mar. 20, 2012

(54) BACKED PILE STRIP

(75) Inventors: Ian Pawson, Southorpe (GB); Mark D. Foster, Pittsford, NY (US); Vincent Outters, Bellem (BE); Thomas M Sesock, Pittsford, NY (US); Edgar Schuerwegen, Koekelare (BE)

(73) Assignee: Schiegel Systems, Inc., Rochester, NY (US)

( * ) Notice: Subject to any disclaimer, the term of this patent is extended or adjusted under 35 U.S.C. 154(b) by 737 days.

This patent is subject to a terminal disclaimer.

(21) Appl. No.: 11/718,848

(22) PCT Filed: Nov. 8, 2005

(86) PCT No.: PCT/US2005/040391
§ 371 (c)(1),
(2), (4) Date: Jan. 14, 2008

(87) PCT Pub. No.: WO2006/052949
PCT Pub. Date: May 18, 2006

(65) Prior Publication Data
US 2009/0258184 A1 Oct. 15, 2009

(30) Foreign Application Priority Data
Nov. 8, 2004 (GB) .................................. 0424547.8

(51) Int. Cl.
*B32B 5/02* (2006.01)
*D05C 15/00* (2006.01)
*E06B 7/16* (2006.01)

(52) U.S. Cl. ............. 428/96; 428/95; 156/72; 156/148; 156/244.11; 264/271.1; 264/279; 49/475.1

(58) Field of Classification Search .................... 428/95, 428/85, 97, 96, 88, 92, 93, 102; 156/72, 156/148, 244.11; 264/271.1, 279; 49/475.1
See application file for complete search history.

(56) References Cited

U.S. PATENT DOCUMENTS

| | | | | |
|---|---|---|---|---|
| 3,081,614 A | * | 3/1963 | Salick | 112/409 |
| 4,024,004 A | * | 5/1977 | Metzler | 156/169 |
| 4,078,106 A | * | 3/1978 | Lind | 428/36.1 |
| RE30,359 E | * | 8/1980 | Metzler | 156/169 |
| 4,288,482 A | * | 9/1981 | Beck | 428/92 |
| 4,288,483 A | * | 9/1981 | Miska et al. | 428/92 |
| 4,302,494 A | * | 11/1981 | Horton | 428/95 |
| 4,313,990 A | * | 2/1982 | Franklin et al. | 428/85 |
| 4,419,315 A | * | 12/1983 | Kessler | 264/145 |
| 5,093,181 A | * | 3/1992 | Sanchez | 428/167 |
| 5,817,390 A | * | 10/1998 | Johnson | 428/85 |
| 6,878,428 B2 | * | 4/2005 | Hope | 428/94 |
| 7,329,450 B2 | * | 2/2008 | Wylie et al. | 428/95 |
| 2002/0168507 A1 | * | 11/2002 | Hope | 428/297.4 |
| 2004/0076790 A1 | * | 4/2004 | Wylie et al. | 428/85 |
| 2006/0068156 A1 | * | 3/2006 | Holiday et al. | 428/93 |
| 2007/0264466 A1 | * | 11/2007 | DeMello | 428/89 |

* cited by examiner

Primary Examiner — Cheryl Juska
(74) Attorney, Agent, or Firm — Barnes & Thornburg LLP (57) ABSTRACT

A pile stripping comprising pile extending from a backing is described whereby the pile is made from pile yarns and the backing is bonded to the pile. A synthetic fiber is interlaced with the pile yarns, and the backing traps at least a part of the synthetic fiber in the backing. The stripping can further comprise a fin, whereby the fin can be located within the pile or alongside the pile. The backing and the fin may be constructed so that the backing is inserted in the fin.

23 Claims, 11 Drawing Sheets

BACKED PILE STRIP

The present invention relates to pile stripping such as protective stripping or pile weather stripping or specialized brushes and methods of making the same. The invention also includes machinery for forming such pile stripping, and a method for making such stripping.

TECHNICAL BACKGROUND

Pile stripping has been, and still is applied around windows, screens and doors. Typically such stripping is manufactured in large quantities in continuous lengths for this purpose. The typical standard for weather stripping is a flat backing with a woven pile material extending from the backing. This weather stripping is typically inserted into a T-shaped slot around the window, screen or door.

SUMMARY OF THE INVENTION

An object of the present invention is to provide an improved pile stripping and method of making the same. An advantage of the present invention is that the method can be more economic and efficient at higher speeds. A further advantage of the method is that it can allow for wider variations of backing profiles, pile heights and better quality. A further advantage is that the pile can provide optical protection for a fin especially a rubber or elastomeric fin.

The present invention provides a pile stripping comprising pile extending from a backing whereby the pile is made from pile yarns and the backing is bonded to the pile. A synthetic fibre is interlaced with the pile yarns, and the backing traps at least a part of the synthetic fibre in the backing. The stripping can further comprise a fin, whereby the fin can be located within the pile or alongside the pile. The backing and the fin may be constructed so that the backing is inserted in the fin.

In one aspect a pile stripping according to the present invention uses a pile having first fibres and second fibres and an elongate backing, e.g. a thermoplastic elastomer, rubber, elastomer, polymeric or resin backing that is formed, e.g. extruded, around the pile and including the second fibres. The backing will typically be made of polypropylene, PVC or a replacement therefore or EPDM rubber.

Embodiments of the present invention can be used, for example, in windows, such as PVC windows so that the combination of pile weather stripping and PVC window extrusion sections can be recycled without subsequently separating them. The pile stripping may also be used in doors or insect screens. The product may also be used in the automotive industry to cover vents or access slots, e.g. slots in the floor of an automotive vehicle for positioning and securing seats into floor attachments. The product may be used for optically screening and optically protecting the open top of such a slot.

The product can be made using a first fibre or thread such as a natural or polymeric fibre or thread which is used as a pile. Second fibres are located around or interlaced, interwoven, etc. e.g. by weaving or knitting, with first pile fibres, e.g. pile threads or yarns. The second fibres extend in a direction substantially perpendicular to the longitudinal direction of the pile yarns. A thermoplastic, elastomeric, polymeric or rubber backing is provided such as a PVC or polypropylene or EPDM backing which encapsulates at least a part of the second fibre or thread. The backing may bond to the second fibre or it mechanically trap the fibre.

The backing is preferably an extruded profile. The cross-section of the backing may clip into or slide into a recess in a plastic or metal frame such as into a slot in the floor of an automotive vehicle or into a window frame, door or screen. Preferably the backing is extruded over an end of the pile yarns to thereby encapsulate at least a part of the second fibre or thread while leaving the other end of the pile threads or yarns free.

The backing or base can be a foamed material, i.e. a foamed rubber, thermoplastic elastomer, elastomer, polymer, etc. The backing may be a thermoplastic polymer or a thermoplastic elastomer or a rubber. If required the backing can be cross-linked or vulcanized. Any suitable pile can be used, e.g. woven, non-woven such as knitted or wound. The backing can be shaped for insertion into a retaining slot, e.g. a T-shaped slot, especially for automotive vehicles, windows and doors. Even lengths of filaments, e.g. woven or non-woven filaments such as knitted or wound filaments are secured along the sides of the backing and/or in the backing itself by allowing a polymer or resin to surround the pile.

The present invention can have the advantage of giving exceptional adhesion between the pile and the backing. The adding or removing of filling yarns, picks and changing of the yarn denier determines the insulating quality of the pile stripping. In a particularly preferred embodiment, one or more fins can be added to the pile stripping. The fin or fins can be added by inserting the one or more fins into the pile or the one or more fins can be extruded as part of the process to give additional insulating abilities or one or more fins may be adhered or glued to the backing of the pile stripping or the pile stripping may be inserted into an integrated fin and backing. The fins may be made of the same material as the backing or may be a different material. For example, the fins may be made of a polymer or resin, e.g. PVC or polypropylene, or a thermoplastic elastomer, or a rubber, or a polymer. If the backing is made of a polyolefin then the fin can be made of the same material, e.g. such as polypropylene or a mixture of polypropylene and polyethylene or the fin can be made of different materials.

A further advantage of the method of making the pile stripping according to the present invention is that it allows flexibility in fabrication parameters, e.g. varying the pile height, the pile density and backing configuration to include throat width, slot width e.g. T-slot width, slot backing depth, e.g. T-slot backing depth and varying fin heights.

The present invention also includes machinery for forming such weather stripping, as well as a method for making such weather stripping.

The pile can be made of polymeric yarns or threads, e.g. a polyolefin pile yarn such polypropylene pile yarns or any other synthetic fibre as well natural fibres. Combinations of yarns may be used, e.g. a polyolefin pile yarn such polypropylene pile yarns or any other synthetic fibre combined with PVC warp- or PVC coated warp/backing yarns in a knitting or weaving process. The yarns may be made from different polymeric material than the backing. It is advantageous to coat the pile yarns with a layer of a material which bonds to the backing material, or to coat with the same material as the backing material.

In accordance with embodiments of the invention methods and products are provided which allow a pile yarn material to be used which does not bond easily with a polymer used for the backing. For example, polypropylene yarn will not easily bond to the material of the backing, e.g. to a PVC extrusion. In an aspect of the present invention PVC coated warp yarns are mechanically connected to a PVC backing. These PVC coated warp yarns are located around or are interlaced or interwoven with the pile yarns, e.g. they are knitted or woven into pile yarns, e. g. polypropylene or other synthetic yarns.

This combination is then bonded to a polymeric backing such as a PVC extrusion thereby effecting a bond between the polypropylene or other synthetic yarn and the polymeric backing, e.g. PVC extrusion.

Ends of the yarns may be singed, pre-coated or a combined process may be used of singing and pre-coating to secure the pile yarns together and to improve the bonding of the knitted or woven interlaced first fibre, e.g. PVC yarn with the backing, e.g. with the extruded profile.

The polymer materials used for the backing, e.g. PVC resins, preferably provide the necessary stiffness and rigidity to be able to insert the finished profile into a frame such as a door or window frame both inline during the PVC window/door profile extrusion or off line in PVC extruded profiles. This avoids the use of metal reinforcing materials which may make recycling difficult.

The singing process runs normally at 470° F. and the extrusion—coating process at 320-350° F. Those temperatures however are only indicative and may vary depending on the yarns and resins used.

Product according to embodiments of the present invention can be used in PVC extrusions so that the scrap can be recycled, e.g. reuse of the total product recuperated without removing the pile weather strip first.

DETAILED DESCRIPTION

The present invention will be described with reference to certain drawings and to certain embodiments but this description is by way of example only. The weather stripping according to the present invention may be for use in a retaining slot, e.g. a T-slot into which the weather stripping is inserted with an interference fit.

Figure 1:
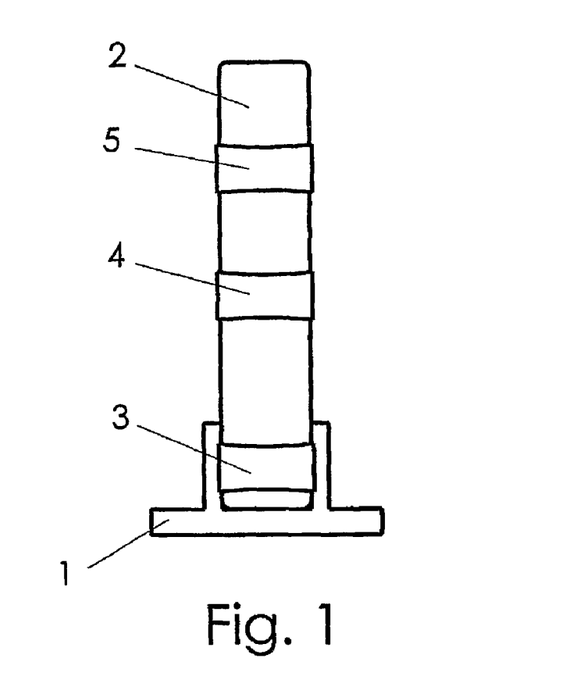
FIG. 1 is a drawing of the weather stripping showing the knitted pile with an extruded backing in accordance with an embodiment of the present invention.

FIG. 1 shows an embodiment of the present invention. It comprises a backing 1 which encapsulates the ends of pile yarns 2. The pile yarns 2 can be woven or non-woven pile yarns such as knitted yarns. The pile yarns are held together or supported by at least one synthetic yarn 3. The synthetic yarn 3 can be located around or interlaced or interwoven into the pile yarns 2, e.g. by knitting or weaving. Whereas the pile yarns 2 are shown extending substantially vertically on the page, the synthetic yarns extend substantially perpendicular to this direction.

The synthetic yarn 3 is preferably coated with or comprises a polymer material which bonds well to the material of backing 1. For example, when the backing is polypropylene or PVC, then the synthetic yarn 3 can be polypropylene or PVC yarn or PVC coated synthetic yarn. Where the backing is EPDM then EPDM rich or coated fibres can be used.

One or more additional or optional synthetic warp ends 4, 5 may be used to restrain or control the pile threads, e.g. they may laid around or be woven or knitted into the pile yarns 2. These additional or optional threads can be made of any suitable material, e.g. textile, synthetic or natural threads.

Figure 2:
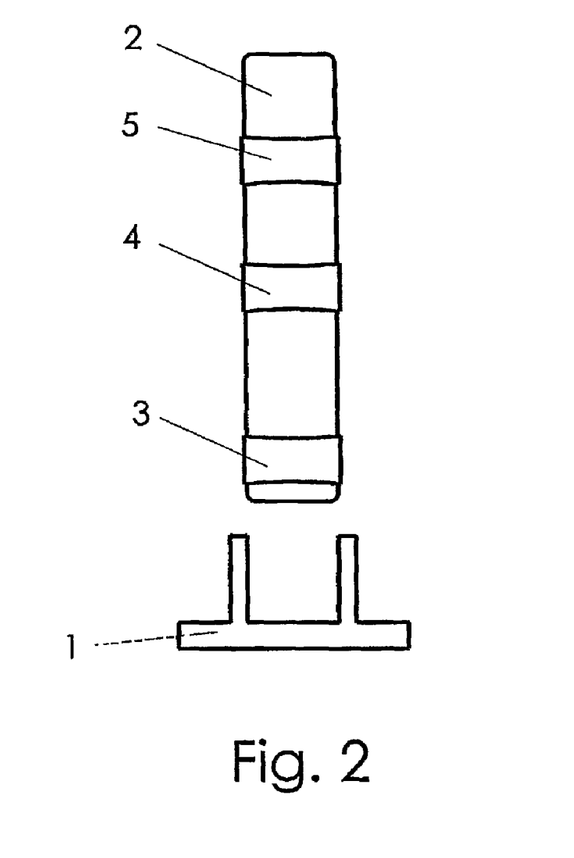
FIG. 2 is a drawing of the weather stripping showing the knitted pile separate from the backing.

FIG. 2 shows the secured pile yarns 2 before being fixed or bonded to the backing 1.

Figure 3:
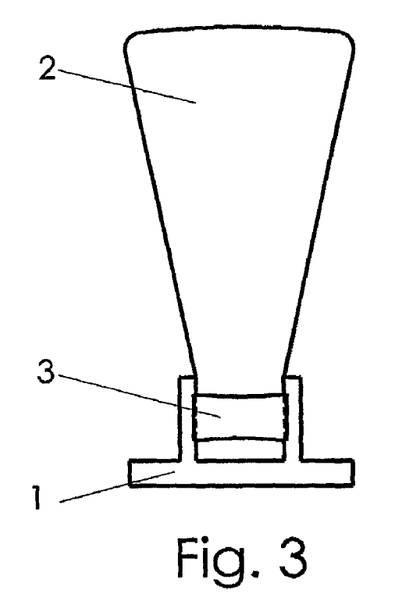
FIG. 3 is a drawing of the weather stripping showing the knitted pile allowed to bloom in accordance with an embodiment of the present invention.
Figure 4:
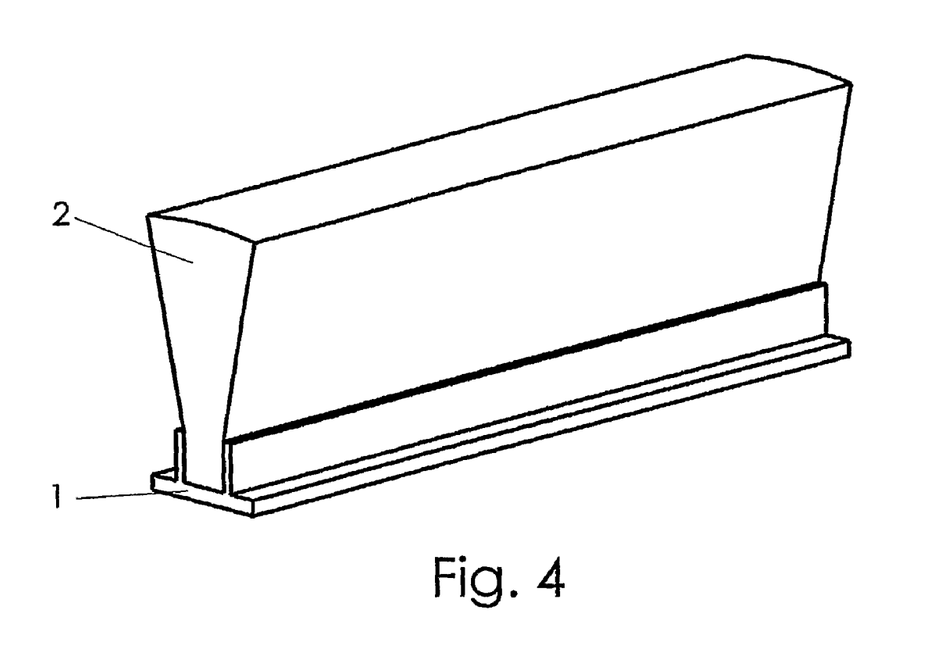
FIG. 4 is a drawing of the weather stripping showing the knitted pile with an extruded backing in accordance with an embodiment of the present invention.
Figure 5:
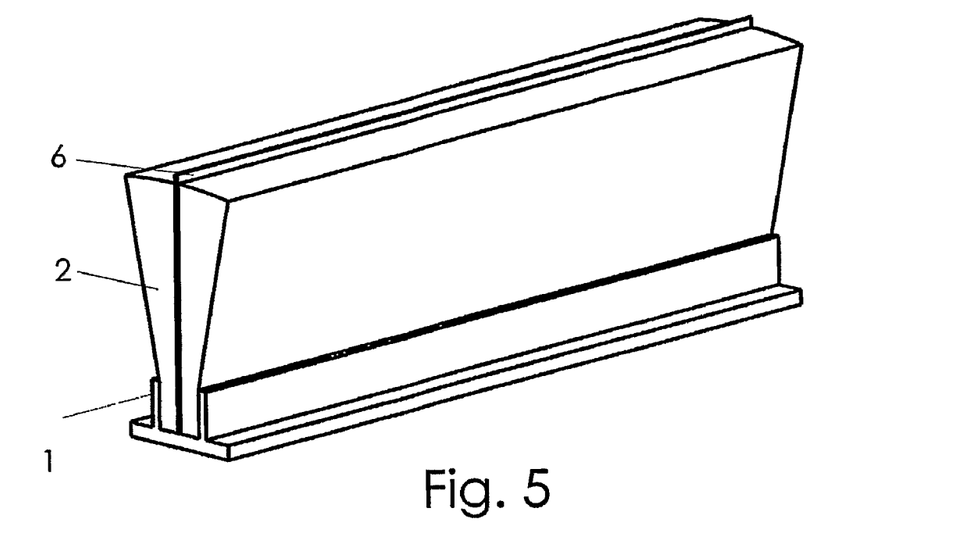
FIG. 5 is a drawing of the weather stripping showing the knitted pile with a center fin in accordance with an embodiment of the present invention.
Figure 6:
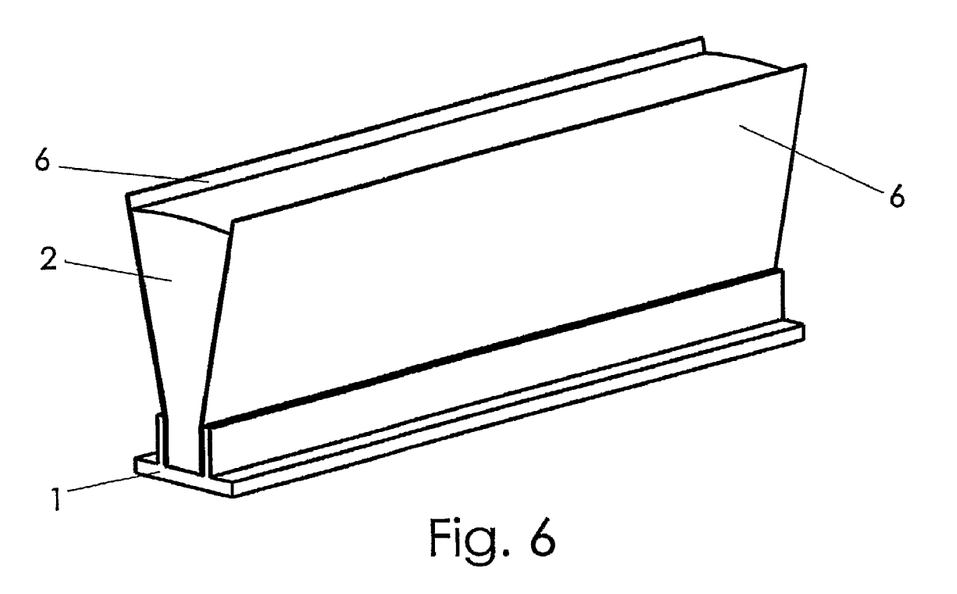
FIG. 6 is a drawing of the weather stripping showing the knitted pile with an outside fin in accordance with an embodiment of the present invention.
Figure 7:
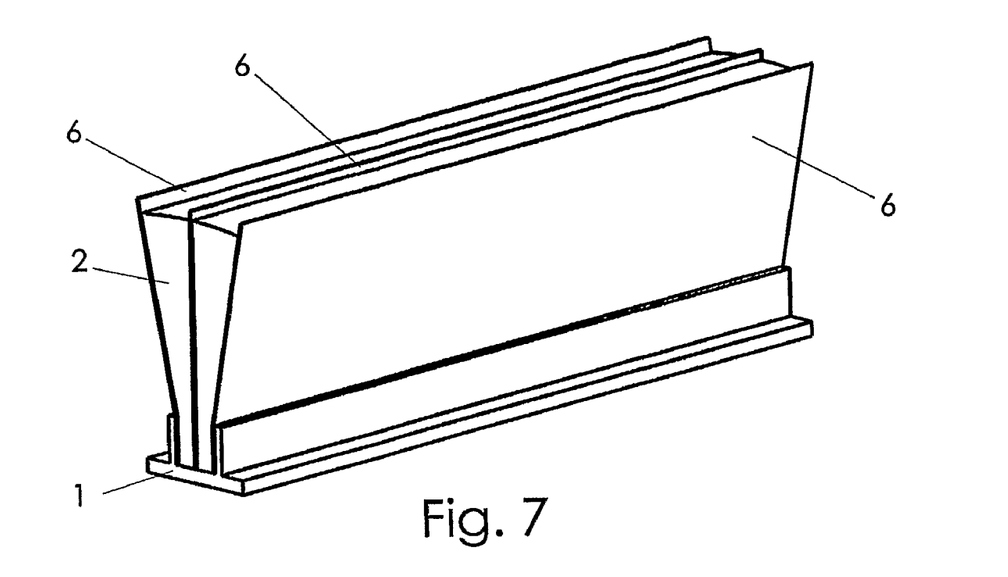
FIG. 7 is a drawing of the weather stripping showing the knitted pile with two outside fins and a center fin in accordance with an embodiment of the present invention.
Figure 8:
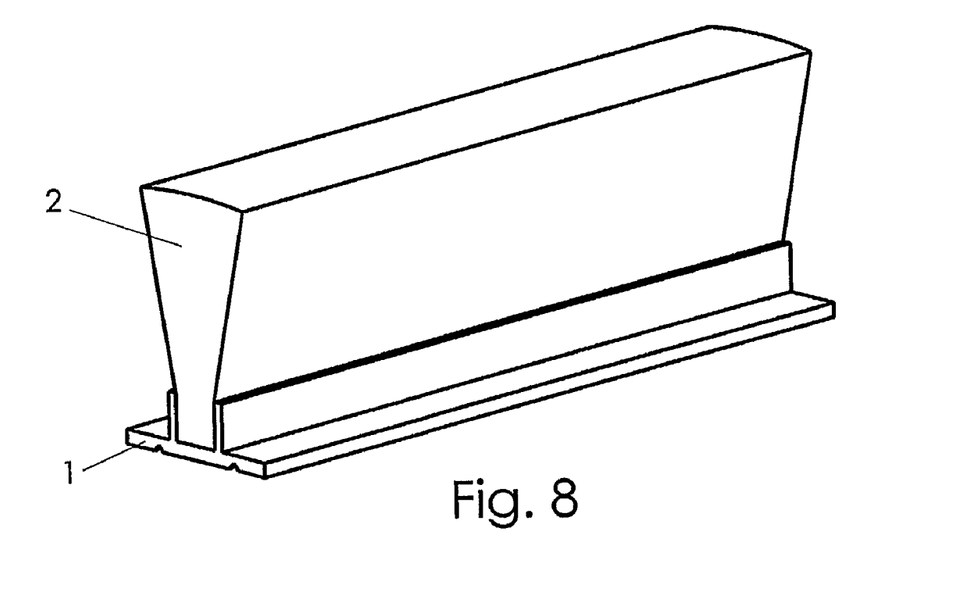
FIG. 8 is a drawing of the weather stripping showing an extruded scored backing to act as a living hinge in accordance with an embodiment of the present invention.
Figure 9:
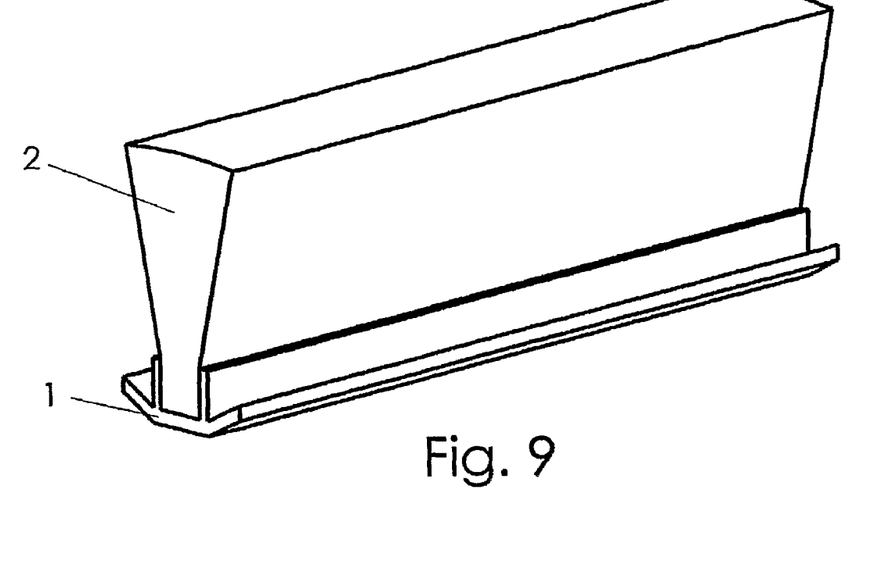
FIG. 9 is a drawing of the weather stripping showing an extruded V-backing in accordance with an embodiment of the present invention.
Figure 10:
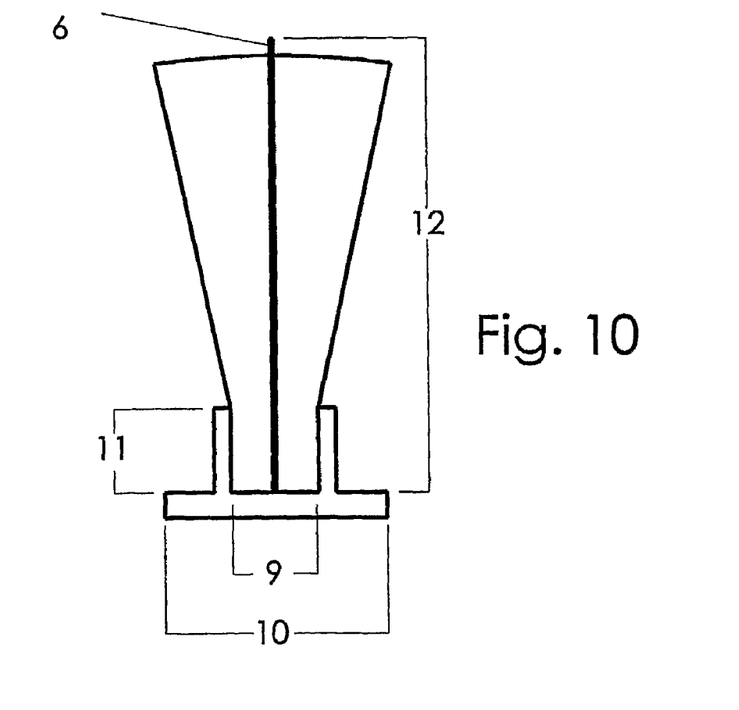
FIG. 10 is a schematic cross-section of a weather stripping in accordance with the present invention.

After the fixing of the backing 1 to the pile yarns 2 in such a way as to trap the ends of the pile yarns 2 and at least some of the synthetic yarns 3 and to bond the backing to these, some or all of the additional restraining yarns 4, 5 may be removed or cut away as shown in FIG. 3.

FIGS. 4 to 9 show various designs of weather stripping which can be used with the present invention. The weather stripping comprises an elongate backing 1 and pile threads 2 or filaments extending therefrom at any suitable angle. The pile threads have further fibres 13 shown in FIG. 12A, which are interlaced with the pile threads. The interlaced fibres are at least partly trapped in the backing in the final product. The interlaced fibres preferably bond well to the backing in the final product In accordance with an embodiment of the present invention extruding a continuous length of thermoplastic elastomer, rubber, polymer or resin forms a profiled backing 1 of the pile stripping as shown in all of FIGS. 4 to 10. The thermoplastic elastomer, rubber, polymer or resin is allowed to flow in a plastic or molten state around the pile with the interlaced fibres 13 giving exceptional bonding between the pile and backing. To achieve this the pile is fed into a suitable extruder. A preferred resin or polymer is PVC or polypropylene or a blend of polypropylene and polyethylene. The backing may be of a foamed material. The backing may be cross-linked.

Figure 11:
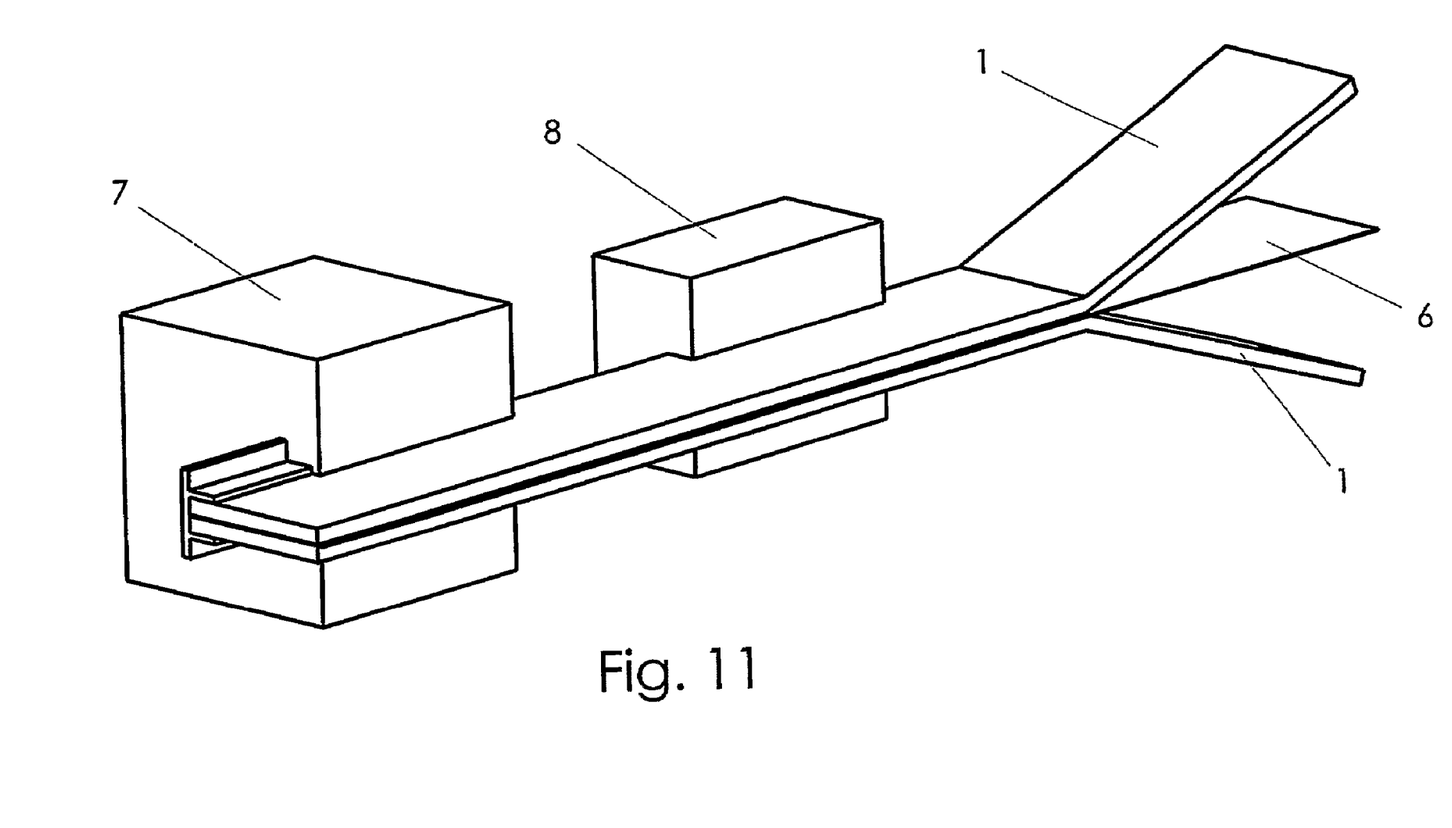
FIG. 11 is a schematic representation of machinery for a process according to an embodiment of the present invention in accordance with an embodiment of the present invention.

In an alternative method and to further enhance the bonding between the backing and the pile, the pile is introduced using guides to a singing bar 8 that heats and pre-melts the pile directly before it is introduced to the extrusion die 7 where the resin is allowed to flow around the pile as illustrated in FIG. 11. The pre-melting is done on the ends of the filaments on one side of the pile strip.

Before forming into a strip of pile for entry into the die, the pile is formed woven or non-woven, e.g. knitted and then slit or cropped to the correct pile height or may be wound as described in U.S. Pat. No. 4,024,004 which is incorporated herein by reference. The pile may be formed of monofilaments or multifilaments, e.g. threads or yarns, of any suitable material, preferably thermoplastic material, e.g. polymeric filaments. By adjusting the density of the pile by adding or subtracting picks, filling yarns and changing of the yarn denier determines the insulating quality of the weather stripping.

In accordance with an embodiment of the present invention one or more fins 6, e.g. made of a polymeric material such as a polyolefin, e.g. polypropylene or a blend of polypropylene and polyethylene, or rubber or thermoplastic elastomer can be included within the pile. A fin can further enhance the insulating quality of the pile stripping. It can also increase the optical protection or screening provided by the pile stripping. A fin maybe located within the pile and/or at the side of the pile. The fin or fins extend in the same direction as the filaments of the pile from the backing. The fin or fins can be the same length as the pile, i.e. is coterminous with the filaments or maybe be a different length. In one embodiment when N fins are to be added to the weather stripping, where N is one or more, the strand of pile is divided into N, N−1 or N+1 strips and these separate strips of pile are run simultaneously into the extrusion die where the fin or fins can be co-extruded along with the backing. The N, N−1, or N+1 strips of pile can be optionally sent through a singing bar before entry into the extruder. In an alternative embodiment the fm or fins can be added to the N, N−1 or N+1 pile strips as a secondary operation and then the combination fed to the extruder die. The fins or fin can be added into the pile by ploughing. Optionally, before the strips of pile enter the die the N fins can be attached to the pile, e.g. by a mechanical or thermal process such as ultrasonically welding or laser welding the fin or fins into place.

Machinery for making the stripping is shown schematically in FIG. 11. Sources of one or more pile strips are provided, e.g. reels or drums and the one or more strips are lead towards an extruder die 7 for co-extrusion with polymer or elastomer from the extruder. Optionally a singer 8 may be provided for singing the pile before it enters the extruder die.

In an alternative embodiment of the present invention one or more pile strips 2 are fed towards a joining device and one or more fins are inserted into the pile. The combination can be temporarily bonded in the joining device before the combination is fed to the extruder die 7. The joining device can be a mechanical or thermal joining device, e.g. an ultrasonic welder or laser welder.

The inventive weather stripping allows for the creation of different backing configurations as shown in FIGS. 1, 3, 8 and 9. The creation of these different backings is based on the profile that is cut into the extrusion die 7 itself along with melt temperatures and material draw downs used in the extruder. The inventive pile stripping allows for the fabrication of any pile height, pile density and backing configuration to include throat width 9, T-slot width 10, T-slot backing depth 11 and varying fin heights 12 (see FIG. 10).

Figure 12:
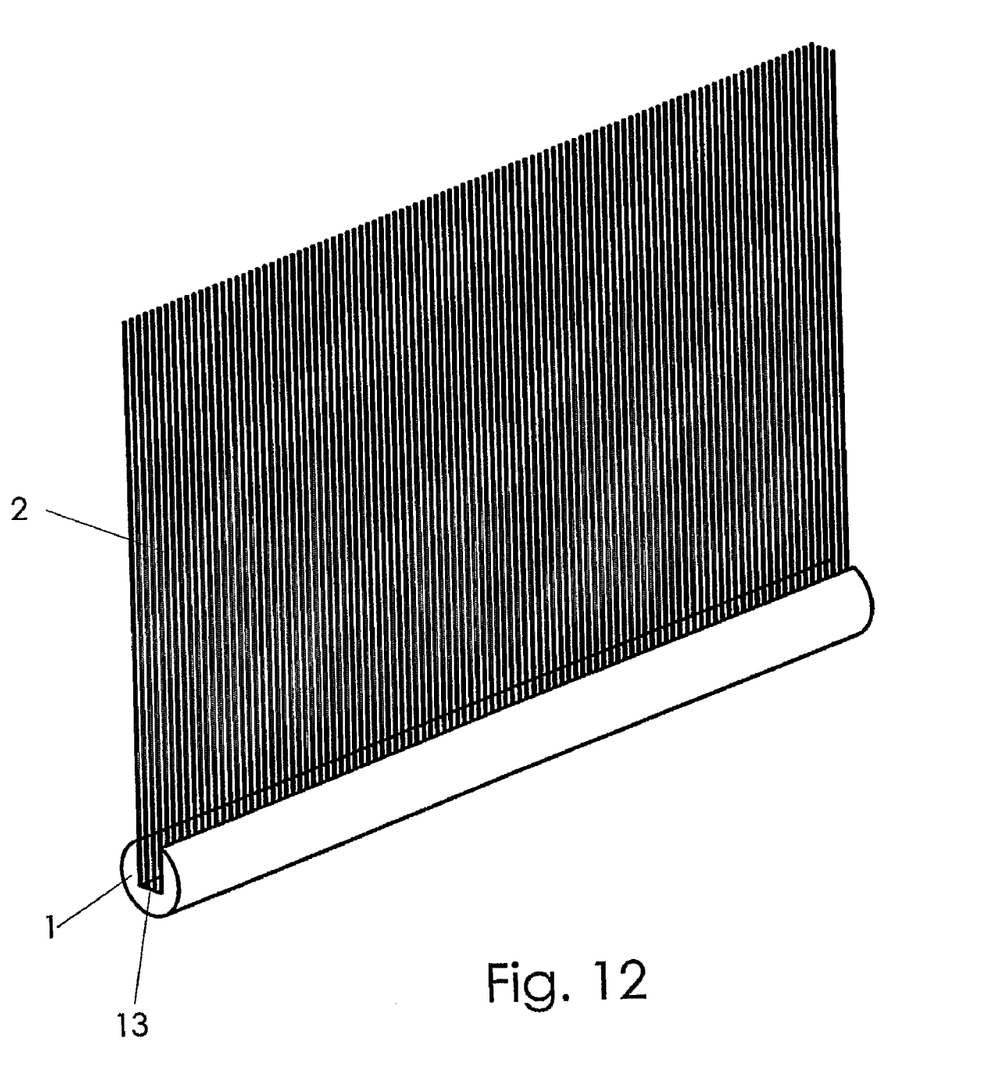
FIGS. 12 to 15 show further embodiments of the present invention.
Figure 13:
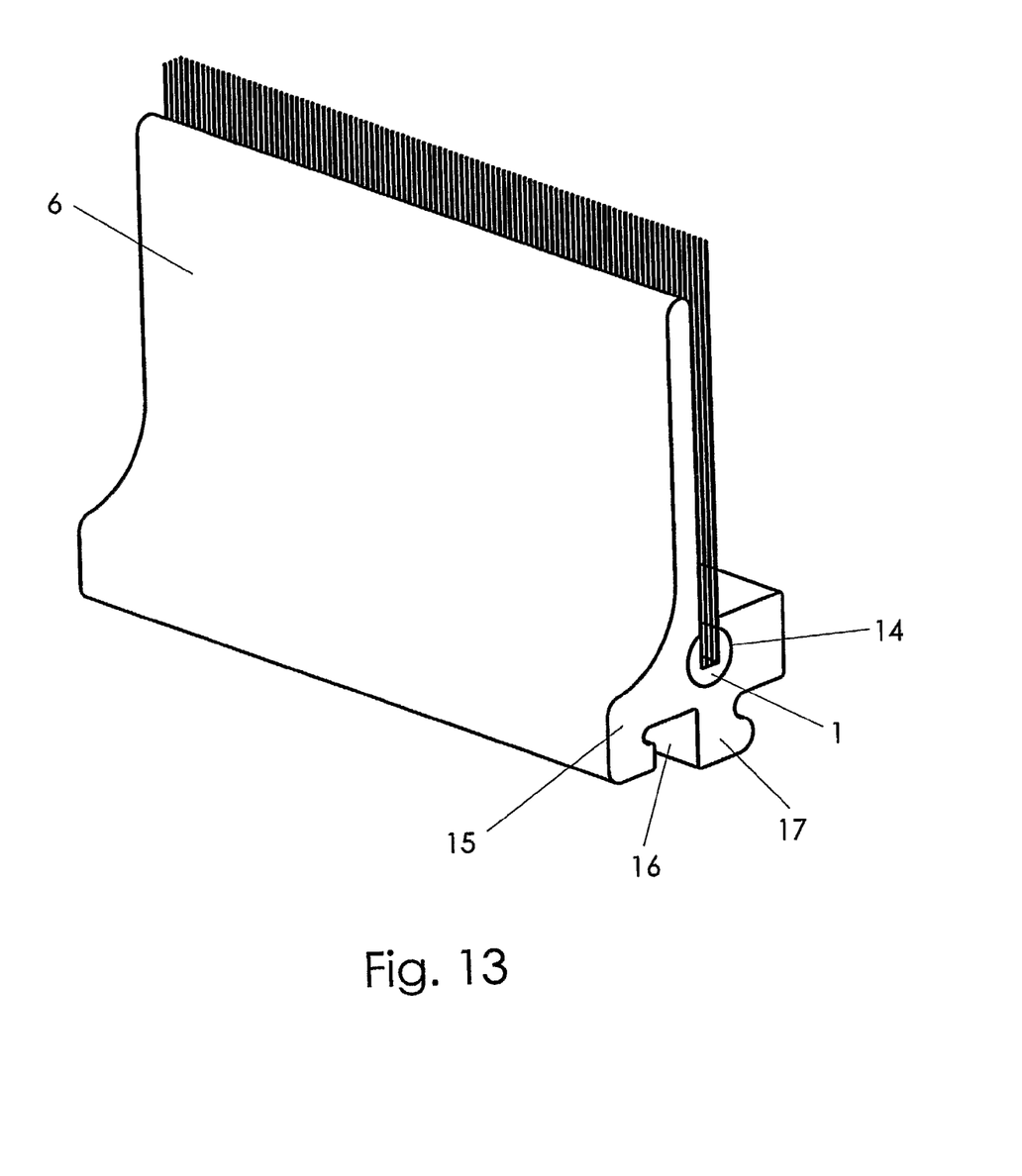

A further design of pile stripping is shown in FIG. 12. It consists of pile yarns or threads 2, e.g. polypropylene, which can be knitted or woven and a backing 1 such as polypropylene. The pile yarns can be interlaced with a second fibre 13 in the region of the backing 1, e.g. by knitting or weaving and this second fibre 13 is preferably trapped in the backing 1, e.g. by extruding the backing 1 over the end of the pile threads 2. A fin 6 can be placed alongside and adjacent to the pile threads as shown in FIG. 13. The fin can be made of a thermoplastic elastomer, a polymer or a rubber. It may be crosslinked. It is preferably flexible. The fin may be foamed. A preferred material for the fin is EPDM rubber which has been cross-linked. The backing 1 is inserted into a groove 14 in a foot 15 of the fin. This may be done mechanically by insertion or by co- or tandem extrusion.

Figure 14:
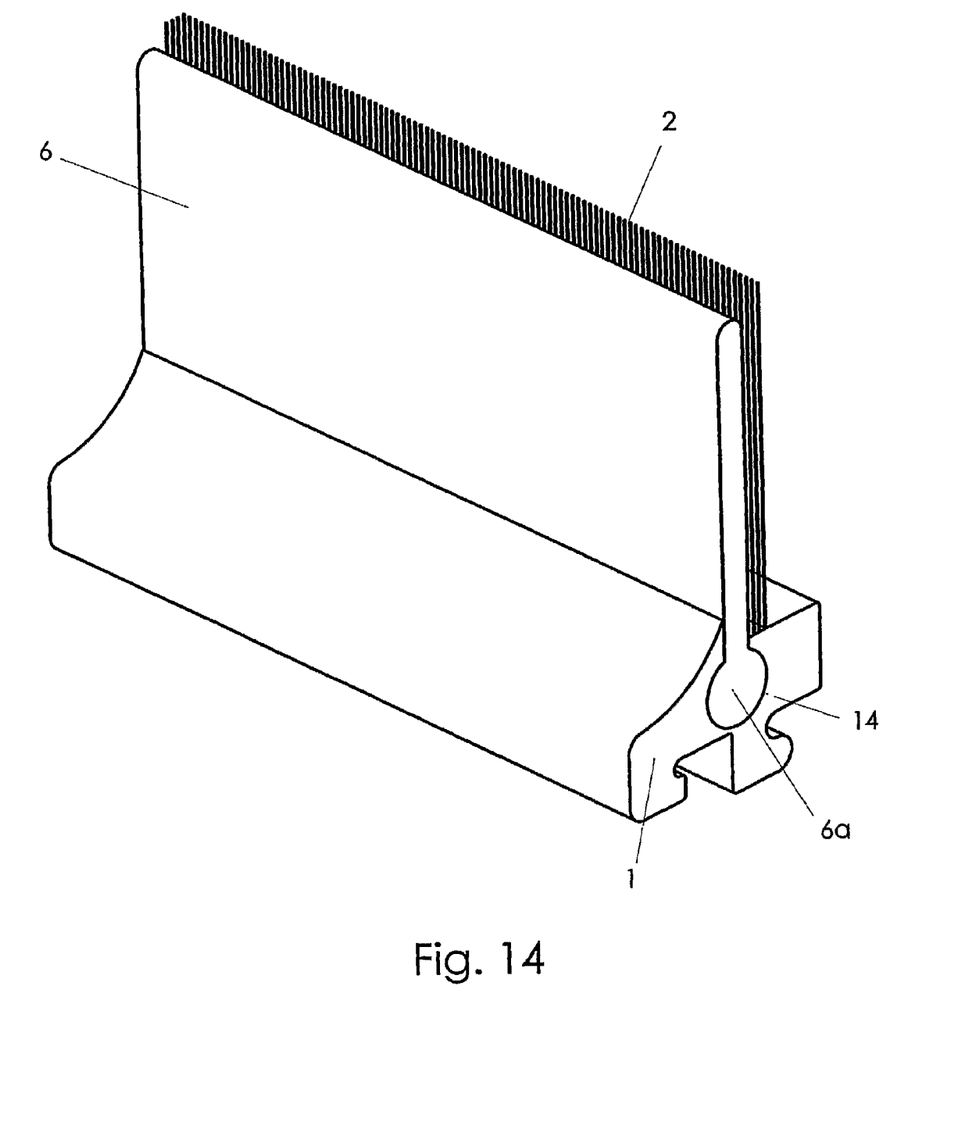

An alternative pile stripping is shown in FIG. 14. Here the fin 6 is first formed as a strip, e.g. as a strip of cross-linked EPDM and is then inserted into a groove 14 in the backing 1 of the pile stripping with pile threads 2. The insertion can be done mechanically into a groove 14 of the backing 1 or may be done by extruding the backing 1 around the end 6a of fin 6. This may be done by feeding the fin 6 as a flat strip into the extruder die 7 as shown schematically in FIG. 11. The end 6a may be suitably shaped to lock to the backing 1 either chemically or mechanically or both. The pile threads and the backing may be polypropylene.

Figure 15:
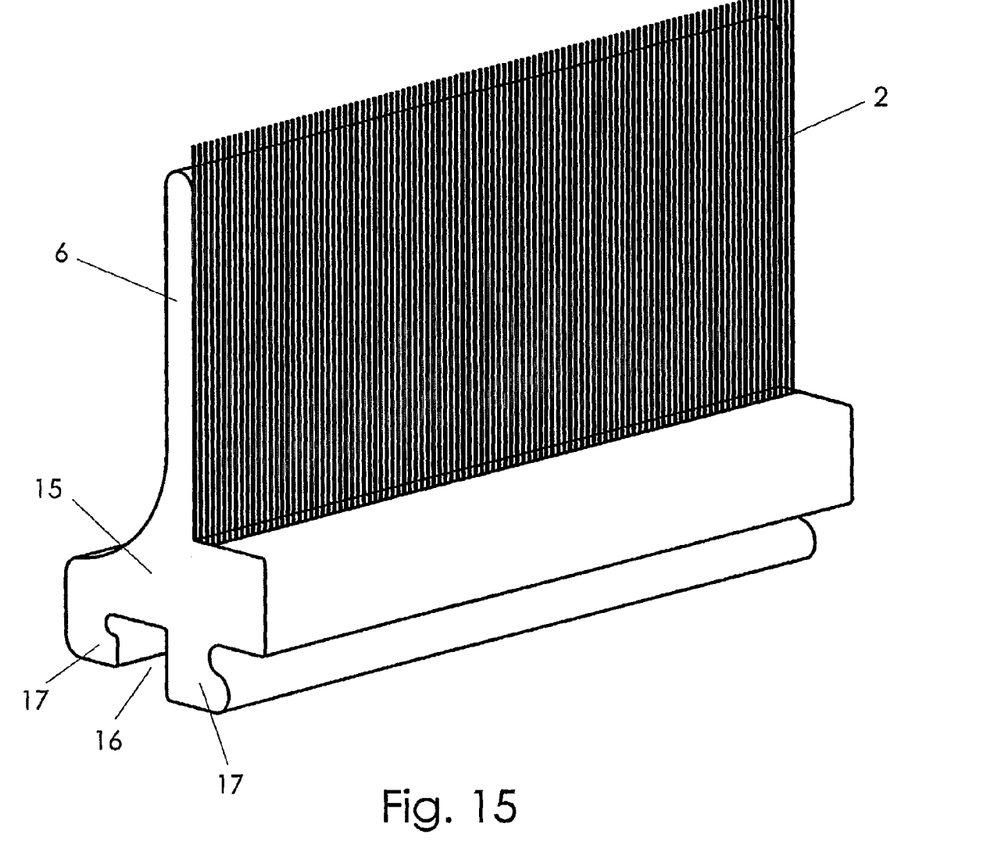

A further embodiment is shown in FIG. 15 in which the pile 2 and its backing 1 is placed adjacent to the fin 6 and the its foot 15. The two parts of this stripping may be fixed mechanically together or chemically. Examples methods are gluing, ultrasound, welding.

In the pile stripping according to FIGS. 12 to 15 a pile having first fibres and second fibres and an elongate backing, e.g. a thermoplastic elastomer, rubber, elastomer, polymeric or resin backing is formed, e.g. extruded around the pile and including the second fibres. In addition at least one fin as added, e.g. made of EPDM rubber.

In all of the embodiments of the invention shown in FIGS. 13 to 15 suitable grooves 16 or protuberances 17 are formed in the backing 1 and or foot 15 to allow the pile stripping to be located into profiles such as metal profiles in windows, doors, floors, etc.

Figure 16:
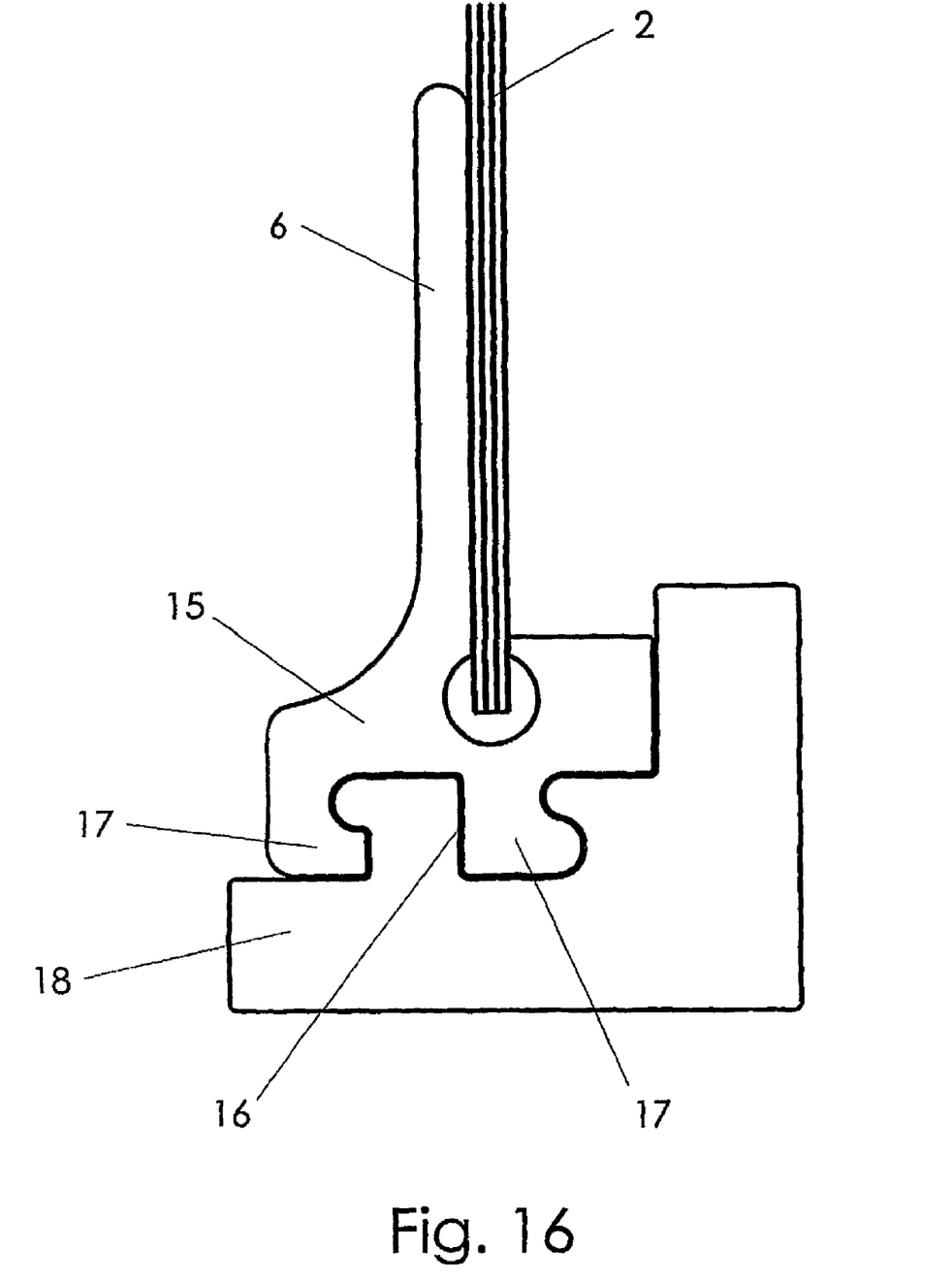
FIG. 16 shows how embodiments of the present invention may be fixed into a profile, e.g. as a flexible protective blind for an automotive vehicle.

An application for any of the pile stripping of FIGS. 13 to 15 is shown in FIG. 16. The stripping is located into a metal profile 18, e.g. by snapping the foot 15 or backing 1 of the pile stripping into appropriately shaped grooves in the profile 18. The grooves in profile 18 preferably mate and interlock with the grooves 16 and protuberances 17 of the pile stripping. Alternatively the two parts of the pile shown in FIG. 15 may be fed together into the relevant grooves in the profile 18. In every case, the pile stripping is held in the profile 18 which may be part of the floor of an automotive vehicle and the stripping extends away from the profile 18 to cover a slot or space, e.g. the insertion slot in the floor of an automotive vehicle for seating. The pile stripping allows retaining parts of the seating such as struts or legs to be pushed down into the slots and onto fixtures for the seating in the base of the floor. When this happens the flexible pile 2 and the flexible fin 6 bend and move downwards out of the way allowing the retaining struts of the seating to go past into their fixtures. As soon as the seat is removed at a later date, the fin 6 and the pile 2 spring back to thereby cover the open slot in the floor. This leaves a neat and optically pleasing covering for the slots in the floor and hides the fixture mechanisms located below.

It is advantageous in this application if the fin is made of elastomeric material such as a rubber like EPDM. The pile fibres may be a pololefin such as polypropylene and the second fibre woven or knitted into the pile fibres for additional strength and to be trapped by the backing may also be a polyolefin such as polypropylene. This combination of polyolefin polymer for the pile threads and second threads and rubber for the fin has shown excellent results as to the ability of the pile stripping to spring back after seating struts are removed from slots in the floors of vehicles after prolonged use. Also because materials such as EPDM and polypropylene are used the high temperature performance is good. In vehicle exposed to sunlight this is advantageous.

What we claim is:

1. A method of forming a pile stripping, comprising:
   knitting a synthetic fibre into an end of pile yarns to hold the pile yarns together thereby forming a strip of pile, the strip of pile having sides and ends, the strip of pile having flat surfaces extending along part of the sides of the strip of pile at the knitted end, feeding the knitted end of the strip of pile into an extruder, forming a profiled backing by extruding a continuous length of thermoplastic elastomer, rubber, polymer or resin, concurrently allowing the thermoplastic elastomer, rubber, polymer or resin to flow in a plastic or molten state around the knitted end of the strip of pile, and bonding the knitted end of the strip of pile to the backing when the thermoplastic elastomer, rubber, polymer or resin solidifies trapping at least a part of the synthetic fibre.

2. The method according to claim 1 further comprising a fin with the pile.

3. The method of claim 2, wherein the fin is located within the pile or alongside the pile.

4. The method of claim 3, wherein the fin is formed with the backing.

5. The method according to claim 3, wherein the fin is formed separately from the backing.

6. The method according to claim 5, wherein the backing is inserted in the fin.

7. The method according to claim 2, wherein the fin is made of a rubber.

8. The method of claim 1, further comprising the step of guiding one or more of the strips of pile into an extruder and forming the backing on the pile by extrusion.

9. The method of claim 8, further comprising singing the pile before it is fed into the extruder.

10. The method of claim 1, wherein the pile yarns do not bond well to the backing and the synthetic fibre includes a material which bonds well to the backing.

11. The method of claim 1, wherein the synthetic fibre includes a polyolefin or a PVC material.

12. The method of claim 1, wherein the backing includes a polyolefin or a PVC material.

13. A pile stripping, comprising:

a synthetic fibre knitted into an end of pile yarns, wherein the strip of pile has sides and ends, the strip of pile having flat surfaces extending along part of the sides of the strip of pile at the knitted end; and a profiled backing extruded around the knitted end of the strip of pile, wherein the backing traps and bonds the knitted end of the strip of pile and at least a part of the synthetic fibre through solidification of a backing material, and wherein the backing material is a thermoplastic elastomer, rubber, polymer or resin.

14. The stripping of claim 13, wherein the synthetic fibre includes a polyolefin or a PVC material.

15. The stripping of claim 13, wherein the synthetic fibre is coated with PVC.

16. The stripping of claim 13, wherein the backing includes a polyolefin or a PVC material.

17. The stripping according to claim 13 further comprising a fin.

18. The stripping according method of claim 17, wherein the fin is located within the pile or alongside the pile.

19. The stripping according to claim 18, wherein the fin is formed with the backing.

20. The stripping according to claim 18, wherein the backing is inserted in the fin.

21. The stripping according to claim 13 wherein the fin is made of a rubber material.

22. The method of claim 8, further comprising forming raised edge portions in the strip.

23. The pile stripping of claim 13, wherein the profile of the backing is a T-slot defined by a throat width, a T-slot width, and a T-slot backing depth.

* * * * *

UNITED STATES PATENT AND TRADEMARK OFFICE
CERTIFICATE OF CORRECTION

| | | |
|---|---|---|
| PATENT NO. | : 8,137,783 B2 | Page 1 of 1 |
| APPLICATION NO. | : 11/718848 | |
| DATED | : March 20, 2012 | |
| INVENTOR(S) | : Ian Pawson et al. | |

It is certified that error appears in the above-identified patent and that said Letters Patent is hereby corrected as shown below:

Title Page, Item (73) Assignee: "Schiegel Systems, Inc., Rochester, NY (US)" should read
--Schlegal Systems, Inc., Rochester, NY (US)--

Signed and Sealed this
Fifth Day of February, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,137,783 B2  
APPLICATION NO. : 11/718848  
DATED : March 20, 2012  
INVENTOR(S) : Ian Pawson et al.

Page 1 of 1

It is certified that error appears in the above-identified patent and that said Letters Patent is hereby corrected as shown below:

Title Page, Item (73) Assignee: "Schiegel Systems, Inc., Rochester, NY (US)" should read --Schlegel Systems, Inc., Rochester, NY (US)--

This certificate supersedes the Certificate of Correction issued February 5, 2013.

Signed and Sealed this  
Nineteenth Day of March, 2013

Teresa Stanek Rea  
*Acting Director of the United States Patent and Trademark Office*